JOHN HUGHES.

Improvement in Sash Locks.

No. 4,758. Reissued Feb. 13, 1872.

Witnesses
F. B. Curtis
P. C. Masi

Inventor
John Hughes,
Chipman & Osmun & C.
Attys

AM. PHOTO-LITHOGRAPHIC CO. N.Y. (OSBORNE'S PROCESS.)

UNITED STATES PATENT OFFICE.

JOHN HUGHES, OF NEW BERNE, NORTH CAROLINA.

IMPROVEMENT IN SASH-LOCKS.

Specification forming part of Letters Patent No. 109,516, dated November 22, 1870; reissue No. 4,758, dated February 13, 1872.

Be it known that I, JOHN HUGHES, of New Berne, in the county of Craven and State of North Carolina, have invented a new and useful Improvement in Sash-Fasteners; and I do hereby declare that the following is a full, clear, and exact description of the construction and operation of the same, reference being had to the annexed drawing making a part of this annexed specification.

Figure 1:
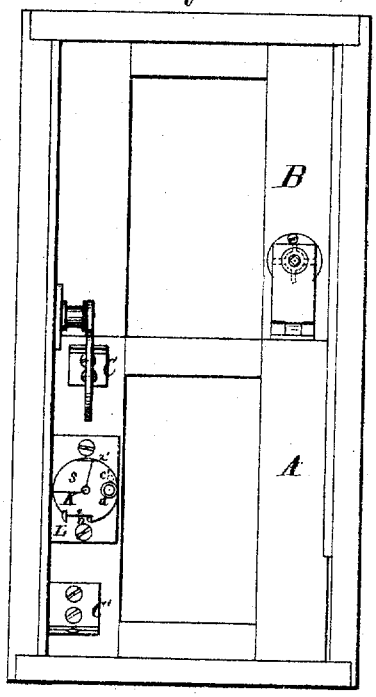
Figure 2:
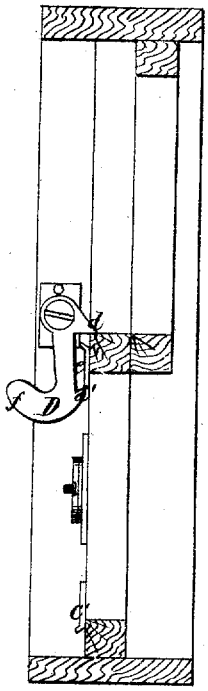
Figure 3:
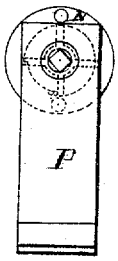
Figure 4:
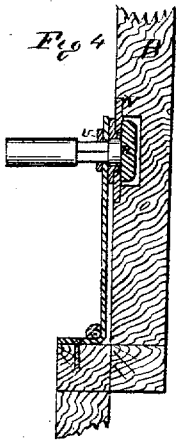
Figure 5:
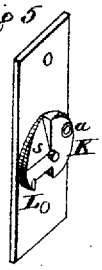
Figure 6:
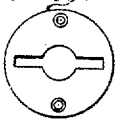
Figure 7:
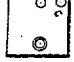

Figure 1 is a front view of my invention; Fig. 2 is a vertical cross-section; and Figs. 3, 4, and 5 are details.

My invention relates to a combined window-sash fastener and lock; and consists in the construction and novel arrangement of devices designed to hold the sashes in any desired position, and, if necessary, to lock or secure them so that they cannot be moved from their places, either upward or downward.

The letter A of the drawing represents the lower sash of the window; B, the upper sash. C C′ represent the catches attached to the upper and lower portions of the lower sash, at the side thereof, or else to the window-frame at suitable points. The upper catch C has its projecting ledge inclined slightly upward, in order that it may not fail to engage with the upper hook or the automatic latch when the sash is lowered. For a similar reason the projection of the lower catch C′ is inclined downward. D represents the automatic latch, which is pivoted to the side of the window-frame when the catches C C′ are attached to the sash, and to the sash when the catches are secured to the window-frame. In the drawing the latch and catches are shown in the former relation. The latch D is constructed with the hooks *d d′* projecting from the edge which is designed to be nearest the surface on which is placed the catches C C′. The outer edges of these hooks are beveled, as shown, so that they will slide over and grasp the catches properly. Between said hooks lies a dovetail recess, *e*, so formed in order to render the form of the hooks such as will allow them to take more secure holds on the catches. From the lower end of the latch D a curved arm, *f*, projects in an opposite direction from that faced by the hooks, so as to form a weight or balance, which will have a tendency to bear the latch toward the catches, and prevent unlocking from accidental causes. The latch is pivoted at its upper end, and is easily thrown up over the upper bar of the sash, where it will rest until the sash is moved upward. The upper hook *d* of the latch operates in connection with the upper catch C, and serves to keep the lower sash down its full distance. The lower hook catches under the lower catch C′, and serves to keep the lower sash up to its full height. K represents an eccentric disk pivoted to the plate L, which is attached to the sash at any desired point, but may be attached to the frame instead. The lower edge of the disk is recessed, and to prevent the disk from revolving beyond certain points, the pin *n* is secured to the plate L and arranged to project up within the recess. The upper wall *z* of the recess is inclined upward and inward, toward the sash, the angle of inclination being about the same as that of the lower hook of the automatic latch. The side of the upper half of the disk K, which lies nearest the window-frame is inclined gradually from the plate L to the face of the disk, forming the path *s* for the passage of the lower end of the latch D up over the face of the disk. This inclination terminates abruptly at a vertical plane, passing through or parallel to the axial line of the disk. The broad edge of the disk immediately adjacent to the inclined plane *s* is also inclined inward and downward at *z′*, the inclination being about equal to that of the upper hook of the latch. *a* represents a sliding pin passing through the disk near its periphery, and arranged to be inserted into the holes *c c′* in the plate L, thereby locking the disk in certain positions.

When it is desired to secure the lower sash in its highest or lowest position, the sash is simply raised or lowered, as the case may be, the weighted end of the automatic latch causing it to become engaged with the catch C or C′. In order that the sash may be held at any intermediate height the disk K is placed at a corresponding height from the top of the sash, and the automatic latch will engage therewith, its lower hook catching under the recess in its lower edge. The sash may be held at any other point by raising the stop *a* and rotating the eccentric disk sufficiently to bring its full side against the window-jamb. The eccentric may be locked in this position by depressing the stop *a*. When the latch D is engaged with the disk K the lower sash may be locked in position by turning the disk sufficiently to bring the upper incline *z'* into position below the upper hook of the latch. The disk should be secured in this position by means of the pin *a*. When the catches are attached to the window-frame, and the latch is pivoted to the sash, the lower catch has the effect of holding the sash down, while the upper catch serves to hold the sash up. The latch D and catches C C' may be applied to windows without the disk K.

What I claim as new, and desire to secure by Letters Patent, is—

1. The automatic sash-latch D, pivoted at its upper end and provided with the bevel-faced hooks *d d'* and the dovetail recess *e* on one side, and with the balance-hook *f* projecting from the opposite side at its lower end, substantially as specified.

2. In combination, the catches C C' and automatic double-acting latch D having the hooks *d d'*, and adapted to operate substantially as described.

3. In combination, the automatic double-acting latch D having the dovetail recess *e*, the plate L having the holes *c c'*, the eccentric disk K having the inclined places *z z'* in its edge, and the pin *a*, substantially as described.

In testimony that I claim the above I have hereunto subscribed my name in the presence of two witnesses.

JNO. HUGHES.

Witnesses:
J. H. ROBERTS,
J. A. GUION.